United States Patent Office 3,035,022
Patented May 15, 1962

3,035,022
NEW POLYMER COMPOSITIONS AND
PROCESS OF PREPARATION
Olden E. Paris, Wilmington, Del., assignor to E. I. du Pont de Nemours and Company, Wilmington, Del., a corporation of Delaware
No Drawing. Filed Oct. 23, 1958, Ser. No. 769,075
3 Claims. (Cl. 260—52)

The present invention relates to new polymeric compositions and to a novel process for their preparation. More particularly, the present invention pertains to new cross-linked substituted salicylic acid-formaldehyde resins, wherein the salicyclic acid substituent is either a hydroxyl or alkoxy radical.

The new polymers of the present invention are 20–40 mol percent cross-linked and are characterized by the recurrence of repeat units which may be represented by the following structures:

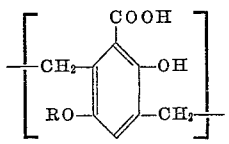

wherein "R" represents H or an alkyl radical. Repeat units having cross-links may be depicted as follows:

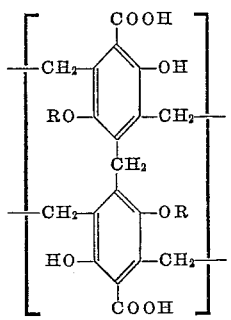

The new polymers are prepared by the reaction of a substituted salicylic acid of the type specified with formaldehyde, preferably in the presence of an alkali metal or alkaline earth metal hydroxide.

It is an object of the present invention to prepare new polymeric compositions. It is a further object of the invention to prepare new substituted salicylic acid-formaldehyde polymers. It is a still further object of the present invention to provide an economical and convenient process for the preparation of the new polymers. These and other objects will become apparent from a consideration of the ensuing specification and claims.

The new polymers are prepared by reacting the substituted salicylic acid monomer with formaldehyde, preferably in the presence of an alkali metal or an alkaline earth metal hydroxide. Since the hydroxyl and alkoxy radicals are activating groups, i.e., ring positions ortho or para to such radicals are actively available for further reaction, a substituted salicylic acid having such a substituent is trifunctional. That is to say, the three remaining positions on the benzene ring are all either ortho or para to a phenolic hydroxyl group (or a methoxy group) and are thus active sites for subsequent reaction. Two of the active ring positions are employed in the formation of a substituted salicylic acid-formaldehyde polymer. The aromatic residues of the substituted salicylic acid are linked together in the polymer chain by methylene bridges which are furnished by the formaldehyde. The third active ring position on the aromatic nucleus of the substituted salicylic acid is then available for cross-linking via additional methylene bridges to a similar site on an adjacent polymer chain.

The invention is further illustrated by the following examples.

Example 1

A mixture of 30.8 g. (0.20 mole) 5-hydroxysalicylic acid, 18 ml. (0.24 mole) 37% formalin, and 2.0 g. barium hydroxide octahydrate was stirred and refluxed for 4 hours. By this time the resin was completely precipitated as a black, rubbery solid. The resin was cured for 96 hours at 120°, giving 26 g. (75%) resin. The product was found to contain 58.2% carbon and 3.9% hydrogen. Theory requires 58.3% carbon and 3.8% hydrogen, indicating that no decarboxylation took place during resinification. The resin, a 20 mol percent cross-linked 5-hydroxysalicylic acid-formaldehyde polymer, had a proton capacity of 5 milliequivalent per gram.

Example 2

A mixture of 25.2 g. (0.15 mole) 5-methoxysalicylic acid, 15 ml. (0.20 mole) 37% formalin, and 1.0 g. barium hydroxide octahydrate was stirred and refluxed for 7 hours. On cooling, the resin solidified. The aqueous layer was decanted, the resin cured at 120° for 96 hours. The yield of cured resin was 15 g. (55%). This resin a 34 mol percent cross-linked 5-methoxysalicylic acid-formaldehyde polymer had a proton capacity of 5 milliequivalents per gram.

As noted above, the new polymers of the present invention are characterized by the recurrence of repeat units which may be represented as follows:

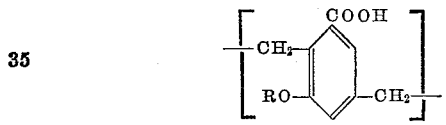

wherein "R" represents H or an alkyl radical. Repeat units involving a cross-link between two polymer molecules may be depicted thus:

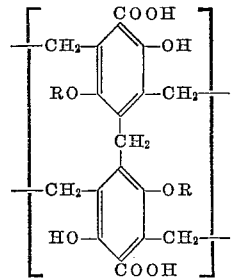

The amount of formaldehyde used for the polymerization must be at least stoichiometric, i.e., 1 mole of formaldehyde per mole of the acid monomer. The extent of cross-linking is then controlled by carefully controlling the amount of formaldehyde used in excess of this 1:1 ratio. 0.5 mole percent of formaldehyde is used per mole percent of cross-linking desired. An undue excess of formaldehyde would result in excessive cross-linking which, in turn, would decrease the chelating activity of the resin for the purposes more particularly hereinafter described. The new resins of the present invention are those which are 20–40 mol percent cross-linked, i.e., one-fifth to two-fifths of the substituted salicylic residues in the polymer are cross-linked via methylene bridges to similar residues of a neighboring polymer chain. This requires a 10–20 mol percent excess of formaldehyde over and above the amount of formaldehyde used in the polymerization.

The substituted salicylic acid monomer starting material may be either the free acid of a salt thereof. As is illustrated in the foregoing examples, the rate of polymerization and cross-linking is enhanced by a catalyst. In the examples, barium hydroxide octahydrate was used. The anhydrous barium hydroxide is also operable as are the other alkali metal and alkaline earth metal hydroxides. Acid catalyst may also be used, as is well known in phenol-formaldehyde polymer chemistry. The acid-catalyzed polymers, however, are not cross-linked and are soluble, fusible materials. If the insoluble, infusible, cross-linked resin of the present invention is desired, an acid catalyst may be used provided the resultant polymer is treated further with formaldehyde in the presence of a base of the aforementioned type in order to obtain the cross-linked resin.

The polymerization is preferably carried out at reflux temperatures (about 100–110° C.) and atmospheric pressure until the resin is precipitated from the reaction mixture. The reaction rate is increased by elevating the temperature and/or pressure. Lower temperatures and pressures are operable, though not preferred since they decrease the reaction rate. The reaction mixture is refluxed until the resin is precipitated. The reaction period will vary somewhat from case to case but good yields are generally obtained in a period from about 4–12 hours. The polymeric product may be recovered by decantation from the aqueous phase formed during the polymerization or it may be recovered by other suitable techniques such as centrifugation or water evaporation.

The initial product of the polymerization must be cured to obtain a 20–40 mol percent cross-linked polymer. The cross-linking is accomplished by means of methylene bridges joining adjacent polymer chains between the substituted salicylic acid residues. The methylene bridges are formed from formaldehyde with elimination of water. The curing is performed at elevated temperatures, for example, 120–160° C., and at atmospheric pressure. Higher pressures are operable but are of no particular advantage since the higher pressure would tend to discourage the elimination of water. Lower pressures are desirable in many cases since, by encouraging the elimination of water, they reduce cure time and also tend to protect the polymer against oxidative degradation. Higher temperatures are likewise operable provided they are not so high as to thermally degrade the resin. Under the foregoing curing conditions, good cures are frequently obtained in periods of about 24 hours.

The ultimate cross-linked polymeric product may be extracted with an alcohol or ketone to remove unreacted monomers.

The new polymers have a special chelating affinity for the uranyl ion, and are thus useful to extract uranium from ore leaches, industrial waste streams, and other uranium-containing solutions, etc. Complete details as to how the new polymers are used for the extraction of uranium from these and other sources may be found in copending application Serial No. 769,065 filed October 23, 1958, in the name of L. G. Donaruma, having a common assignee with the present application.

The following examples will illustrate the use of the new polymers for selectively removing uranium from a solution containing dissolved uranium salts.

*Example 3*

A 1.00 gram portion of the resinous product obtained in Example 1 was slurried for 65 hours with 25 ml. of solution containing 0.0556 millimole $UO_2^{+2}$ at pH 4.0. After separation of the resin, the effluent was found to contain 0.0206 millimole $UO_2^{+2}$. The resin therefore picked up 0.0350 millimole $UO_2^{+2}$ per gram. This represents the removal of 62.9% of the uranium from the original solution.

*Example 4*

A 1.00 gram portion of the resinous product obtained in Example 2 was slurried for 65 hours with 25 ml. of solution containing 0.0556 millimole $UO_2^{+2}$ at pH 4.0. After separation of the resin, the effluent was found to contain 0.00481 millimole $UO_2^{+2}$. The resin therefore picked up 0.0507 millimole $UO_2^{+2}$ per gram. This represents the removal of 91.2% of the uranium from the original solution.

The novel polymeric compositions and a preferred method of preparing same have been discussed in detail in the foregoing specification. Since it will be obvious to those skilled in the art that many departures may be made from the materials and techniques hereinabove described without departing from the spirit of the invention, it is intended to be limited only by the following claims.

I claim:

1. A process for preparation of thermosetting, cross-linked polymeric compositions which comprises reacting a substituted salicylic acid having in the position para to the hydroxyl radical a substituent selected from the group consisting of hydroxyl and alkoxyl radicals with formaldehyde, in the presence of a catalyst selected from the class consisting of the alkali metal and alkaline earth metal hydroxides at a temperature above about 100° C., the mole ratio of formaldehyde to the substituted salicylic acid being at least about 1.1:1 and not more than about 1.2:1.

2. A process as in claim 1 wherein the temperature is between about 100° C. and about 160° C.

3. New insoluble, infusible, polymeric chelating compositions comprising the resinous reaction product of formaldehyde with a substituted salicylic acid having in the position para to the hydroxyl radical a substituent selected from the group consisting of hydroxyl and alkoxyl radicals, the mole ratio of formaldehyde to the substituted salicylic acid being in the range of about 1.1:1 to 1.2:1.

References Cited in the file of this patent

UNITED STATES PATENTS

| | | |
|---|---|---|
| 2,323,481 | McQueen | July 6, 1943 |
| 2,477,641 | Nagel | Aug. 2, 1949 |
| 2,910,484 | Stevens et al. | Oct. 27, 1959 |

FOREIGN PATENTS

| | | |
|---|---|---|
| 471,927 | Great Britain | Sept. 13, 1937 |